US007483380B2

(12) United States Patent
Metke

(10) Patent No.: US 7,483,380 B2
(45) Date of Patent: Jan. 27, 2009

(54) METHOD AND APPARATUS FOR BANDWIDTH MANAGEMENT

(75) Inventor: Anthony R. Metke, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 723 days.

(21) Appl. No.: 10/930,309

(22) Filed: Aug. 30, 2004

(65) Prior Publication Data
US 2006/0045132 A1 Mar. 2, 2006

(51) Int. Cl.
*G01R 31/08* (2006.01)
(52) U.S. Cl. .................. 370/238; 370/237; 370/252
(58) Field of Classification Search ........... 370/238, 370/237, 352, 390; 709/390
See application file for complete search history.

(56) References Cited

U.S. PATENT DOCUMENTS

| 6,144,661 | A  | * | 11/2000 | Katsube et al. ......... 370/390 |
| 6,515,964 | B1 |   | 2/2003  | Cheung et al. |
| 6,600,735 | B1 | * | 7/2003  | Iwama et al. ........... 370/352 |
| 6,657,957 | B1 |   | 12/2003 | Cheung et al. |
| 6,820,134 | B1 | * | 11/2004 | Zinin et al. ............ 709/238 |
| 6,956,821 | B2 | * | 10/2005 | Szviatovszki et al. ... 370/237 |
| 7,187,652 | B2 | * | 3/2007  | Lee et al. .............. 370/238 |

OTHER PUBLICATIONS

Schelen, Olov; Pink, Stephen; "An Agent-Based Architecture for Advance Reservations", Computer Science and Electrical Engineering, Lulea University of Technology S-97187, Lulea, Sweden, 1997 IEEE.
Schelen, Olov; Pink, Stephen; "Sharing Resources Through Advance Reservation Agents", Dept. of Computer Science and Electrical Engineering, Lulea University of Technology, S-97187 Lulea, Sweden, IFIP 1997. Published by Chapman and Hall.
Schelen, Olov; Pink, Stephen; "Aggregating Resource Reservations over Multiple Routing Domains", Computer Science and Electrical Engineering, Lulea University of Technology, SE-97187 Lulea, Sweden, 1998 IEEE.

* cited by examiner

*Primary Examiner*—Chi H Pham
*Assistant Examiner*—Albert T Chou
(74) *Attorney, Agent, or Firm*—Randi L. Karpinia; Indira Saladi

(57) ABSTRACT

A method and system for managing bandwidth by a server in an IP network is disclosed. The method and system creates data structures of network topology information. The method and system receives requests from a first client to communicate with a second client and identifies a set of links to be traversed in the communication by utilizing the network topology information to build an end to end path for the communication. Further, the method and system determine whether each link of the identified set of links has sufficient bandwidth for the end to end path and if there is enough bandwidth, then allocating the bandwidth to allow the first client to communicate with the second client.

13 Claims, 7 Drawing Sheets

TABLE 712

| LINK STATE DB | |
|---|---|
| PK | RTR ID |
| PK | OSPF LINK ID |
| | METRIC<br>INTERFACE TYPE<br>LINK ID |

- - - DIJKSTRA - - →

TABLE 710

| ROUTING TABLE | |
|---|---|
| PK | RTR ID |
| PK | DEST ADDR |
| | NEXT HOP<br>LINK ID |

TABLE 706

| FLOW DEFINITION TBL | |
|---|---|
| PK | SA |
| PK | SP |
| PK | DA |
| PK | DP |
| | FLOW ID<br>FLOW TYPE<br>BANDWIDTH<br>FLOW STATE<br>TIMESTAMP |

TABLE 708

| FLOW TRAVERSAL TBL | |
|---|---|
| PK | FLOW ID |
| PK | LINK ID |
| | |

TABLE 704

| LINK TOTAL BW TBL | |
|---|---|
| PK | LINK ID |
| | BANDWIDTH |

TABLE 702

| LINK BW TBL | |
|---|---|
| PK | LINK ID |
| | ALLOCATED BW |

*FIG. 7*

METHOD AND APPARATUS FOR BANDWIDTH MANAGEMENT

FIELD OF THE INVENTION

The present invention relates generally to Internet Protocol (IP) enabled networks and in particular, to the field of bandwidth management.

BACKGROUND OF THE INVENTION

In general, there are two types of bandwidth management. One is server based and the other is router based (also known as distributed) bandwidth management. Server based bandwidth management allows for easy implementation of quality of service and policy rules but suffers from lack of knowledge of the network. Router based bandwidth management provides for knowledge of the network but is slow and inefficient in call processing, namely call setup. Even though router based bandwidth management is suboptimal, since it provides for knowledge of the network, an implementation called Resource Reservation Protocol (RSVP) has been standardized by the Internet Engineering Task Force (IETF).

While there are existing bandwidth management types, the current types are inefficient and are relatively unsatisfactory. Accordingly, there exists a need for a better method and apparatus for bandwidth management.

BRIEF DESCRIPTION OF THE FIGURES

A preferred embodiment of the invention is now described, by way of example only, with reference to the accompanying figures in which:

FIG. 7 illustrates tables in accordance with one embodiment of the present invention.

Figure 1:
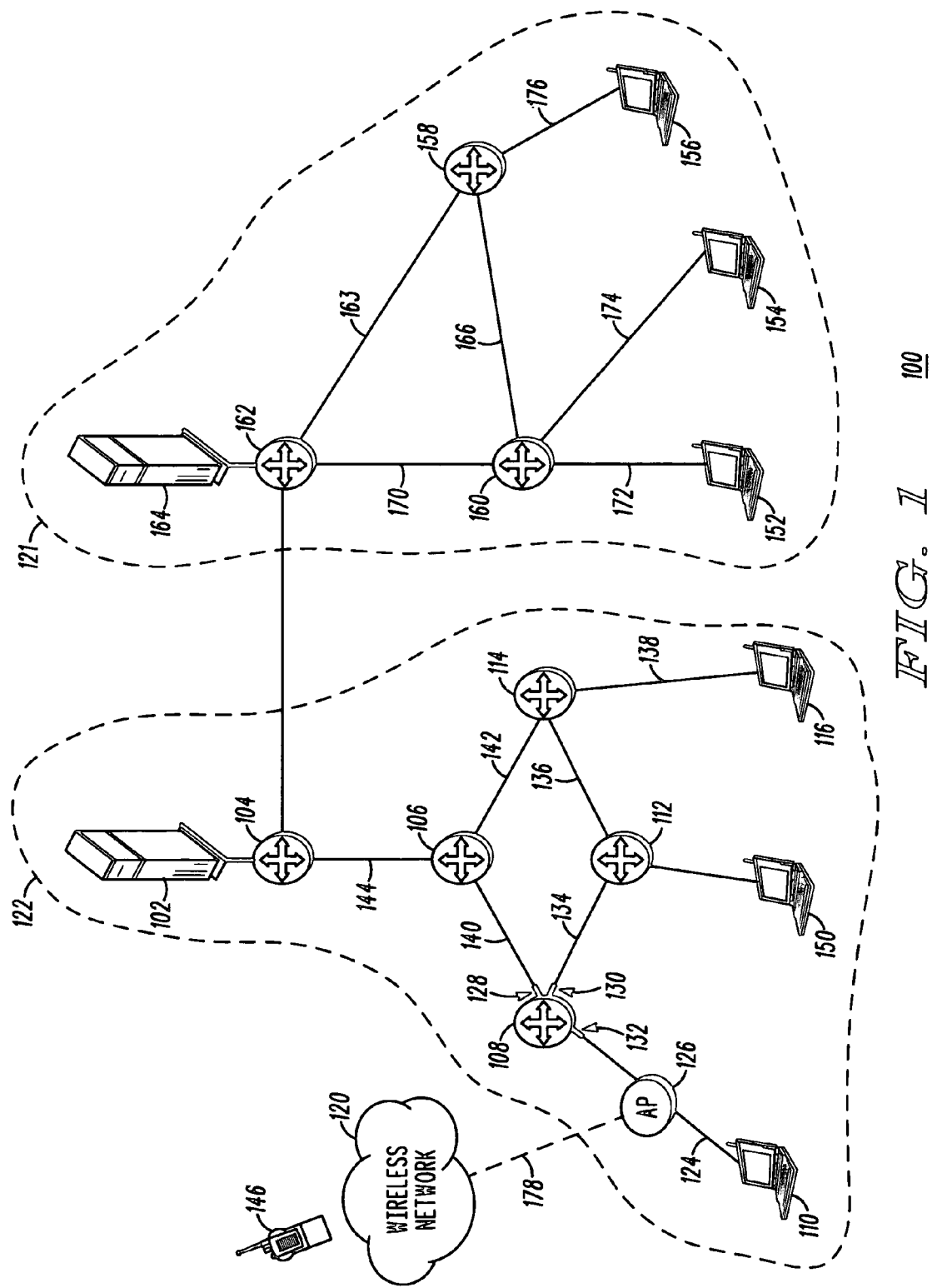
FIG. 1 is a block diagram illustrating an IP network in accordance with one embodiment of the present invention.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

DETAILED DESCRIPTION OF THE PREFERRED EMBODIMENT

FIG. 1 is a block diagram of an illustrative embodiment of an IP network 100 comprising a first wired network 122, optionally a second wired network 121, and optionally a wireless network 120 so that clients of the IP network 100 may communicate in real-time (e.g. a telephone call or a multi-media communication) with each other. As used herein and as known in the art, a communication is also known as a "call."

As mentioned above, the IP network 100 optionally has a wireless network 120 where the wireless network 120 comprises an access point 126 to facilitate communications with a wireless network 120 and a wireless client 146 over a wireless link 178. The wired network 122 has clients 110, 116, 150, routers 104, 106, 108, 112, 114, a session controller 102, other networking equipment (not shown), and links 124, 134, 136, 138, 140, 142, 144 that connect the routers and the clients of the wired network 122. As mentioned above, the IP network 100 optionally has a wired network 121 where the wired network 121 has clients 152, 154, 156, routers 158, 160, 162, a session controller 164, other networking equipment (not shown), and links 166, 168, 170 172, 174, 176 that connect the routers and the clients of the wired network 121.

In the embodiment where both the first wired network 122 and the second wired network 121 are a part of the IP network 100, there is a link 180 that connects wired network 122 with wired network 121. In such an embodiment, the two networks may define two separate domains. The wired network 122 defines one domain and wired network 121 defines a second domain. The link 180 separates the two domains and denotes the demarcation between two domains in the IP network. There are at least three ways to define the two domains. One way is to configure the session controller to have knowledge of all the resources in its domain. For example, session controller 164 may be configured to have knowledge that clients 152, 154, 156, routers 158, 160, 162, and links 166, 168, 170, 172, 174, 176 are a part of one domain. A second way is assign each of the resources in one domain as a part of a specific subnet. For example, session controller 164, clients 152, 154, 156, routers 158, 160, 162, and links 166, 168, 170, 172, 174, 176 may all be assigned IP addresses with the subnet 10.1.5.X. A third way is to utilize a protocol, such as open shortest path first (OSPF), to specify a domain. For example, the session controller 164, clients 152, 154, 156, routers 158, 160, 162, and links 166, 168, 170, 172, 174, 176 may be configured as an OSPF domain.

As shown in FIG. 1, the IP network 100 functions to facilitate calls between clients in the IP network 100. A call is setup by a request to communicate being made by a client in the IP network 100. For example, if the client 110 wishes to communicate with client 116, the client 110 sends a call request packet (also known as a Session Initialization Request) to the session controller 102. The session controller 102 determines if client 110 has knowledge of client 116's location and whether client 116 will accept the call from client 102 by sending a query to client 116. In response, client 116 sends information about whether it will accept or reject the call from client 110. The session controller 102 then forwards the information to client 110 as to whether the call was accepted or rejected and the session controller 102 may also give client 110 information about how to reach client 116. The information that the session controller 102 sends to client 110 may include an IP address or a multicast address.

The clients 110, 116 of the IP network 100 are IP enabled devices. Example clients include desktop or laptop personal computers, PDAs, wireless devices, and cellular phones. The clients 110, 116 of the IP network 100 have session initialization protocol (SIP) software to initiate and make calls with the IP network 100.

The routers of the IP network 100 are commercially available products with IP interfaces and an IP address at each interface. The routers adhere to the OSPF protocol and run OSPF software which allows the routers to share network topology information with each other. As used herein, the term network topology refers to the definition of the IP network 100 as described by the links that connect the routers and the clients in the IP network 100. For example, the network topology for the wired network 122 is defined by the links 124, 134, 136, 138, 140, 142, 144 that connect the routers 104, 106, 108, 112, 114 and the clients 110, 116, 150 in the wired network 122.

The session controller 102 is also an IP enabled device. An illustrative session controller is a server running Windows NT or UNIX. The session controller 102 also has SIP software to manage the calls of the IP network 100. Further, in an illustrative embodiment, the session controller 102 acts as an OSPF router and also implements the OSPF protocol. Session controller 102 is a facilitator which helps clients 110, 116 communicate with each other. In an illustrative embodiment, the session controller 102 contains a bandwidth manager which functions to have knowledge of the IP network 100 topology.

Although this invention is described with respect to OSPF, this invention is not specific to OSPF and OSPF is one embodiment of the invention. References to the OSPF protocol are only illustrative as any protocols which provide link state information may be used. For example, intermediate system to intermediate system (ISIS) protocol which is an OSI standard also may be used. Like OSPF, ISIS also has link state information and messaging regarding link states. Having link state information helps to build the link state tables (e.g. Table 712) described below.

Even though this invention is described with respect to unicast communication and references to an IP address refer to a unicast address (also known as an IP address), this invention is not limited to unicast communication as unicast communication is only an embodiment of the invention. Multicast communications may take place in the IP network 100. For example, a call request packet sent by client 116 may be sent to all the clients in the IP network and not just one client.

Figure 2:
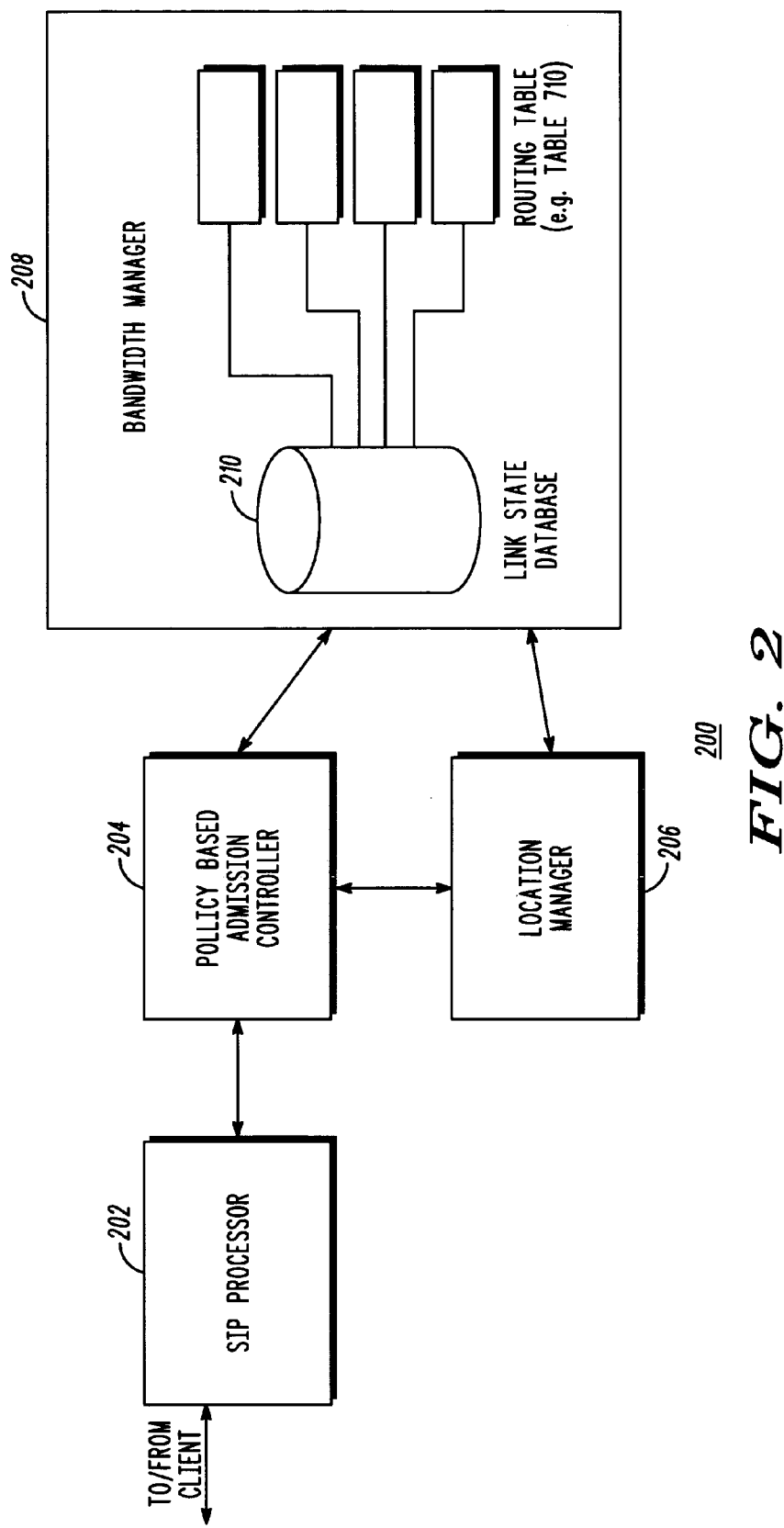
FIG. 2 is a block diagram illustrating a session controller in accordance with one embodiment of the present invention.

FIG. 2 is an embodiment of the session controller 102 shown in FIG. 1. As shown in FIG. 2, the session controller 200 comprises a session initialization (SIP) processor 202, a policy based admission controller 204, a location manager 206, and a bandwidth manager 208. The session controller 200 functions to provide call processing for the IP network 100. The session controller 200 also functions to provide network topology management for the IP network 100. As is known in the art, the session controller 200 may be distributed among two or more servers where one server performs the functionality of the SIP processor 202, the policy based admission controller 204 and the location manager 206 and another server performs the functionality of the bandwidth manager 208. Thus, the bandwidth manager 208 may be a server separate from the session controller.

The SIP processor 202 is a front-end processor of packets in the IP network 100. The SIP processor 202 performs protocol processing and communicates with the clients in the IP network 100. For example, if client 110 wants to communicate with client 116, then the SIP processor 202 receives the call request from client 110 and performs the necessary functions necessary to process the call request. Protocol processing means to respond to packets within a time frame specified by the protocol and to implement a SIP protocol state machine. The SIP processor 202 interfaces with the policy based admission controller 204 to respond to communications with the clients in the IP network 100.

The policy based admission controller 204 manages access to the clients in the IP network 100. Specifically, the policy based admission controller 204 manages rules regarding which clients can call which other clients in the IP network 100. For example, a user of client 110 may desire to call the chief of police at client 116. However, the user of client 110 may not be entitled to call the chief of police or the chief of police's line may be busy. The rules regarding whether the user of client 110 is entitled to preempt the chief of police's busy line or whether the use of client 110 is entitled access to the chief of police at client 116 are managed by the policy based admission controller 204.

The location manager 206 maintains client location information including where each client is attached in the IP network 100. For the example shown in FIG. 1, the location manager 206 may contain information that client 110 is connected to router 108 at router 108's interface 132. When a call is requested by a client, the session controller 200 refers to information in the location manager 206 in setting up the call.

The bandwidth manager 208 maintains information relating to the links and flows necessary for a call in the IP network 100. The bandwidth manager performs this function by maintaining a link state database 210. The bandwidth manager 208 gets location information, specifically the endpoints of a call, from the location manager 206. Then, knowing the endpoints and knowing the network topology, the bandwidth manager 208 is able to build a set of links for each flow wherein a flow is a communication between endpoints in the IP network 100.

In operation, network topology information is exchanged by OSPF packets being sent between the routers in the IP network 100. In an illustrative embodiment, the specific type of OSPF packet used to propagate network topology information is known as a link state advertisement. For example, router 108 sends a link state advertisement to router 106 informing router 106 that it has three interfaces 128, 130, 132 with three IP addresses that correspond to the three networks that router 108 is connected to. The link state advertisement that router 108 sends to router 106 may also be sent to every other router in the IP network 100. For example, the link state advertisement is sent to routers 104, 112, 114. In addition, the link state advertisement may be sent at predetermined times or whenever the network topology changes. Each of the routers in the IP network 100 utilizes the link state advertisements to create a routing table. Whenever a new link state advertisement is received at a router, the router calculates a new routing table. In an illustrative embodiment and as is known in the art, a Dijkstra algorithm is used to calculate the routing table.

Similarly, the session controller 200 utilizes the link state advertisements in the IP network 100 for network topology information. The session controller 200 keeps a copy of each link state advertisement in a link state database 210. An example link state database is shown in Table 712. In one embodiment, the session controller 200 utilizes the information in the link state database 210 to create routing tables from the perspective of each of the routers in the IP network 100 by running the Dijkstra algorithm. For the IP network 100 shown in FIG. 1, there are five routers 104, 106, 108, 112, 114, so the session controller 200 creates and stores five routing tables (e.g. Table 710) corresponding to each of the five routers 104, 106, 108, 112, 114.

Shown in Table 710 is an illustrative routing table. A routing table specifies the next router (also known as "hop") for a given router. For example, for router 104, the next hop is router 106. As shown in Table 710, the routing table (Table 710) contains a router id, an IP address, a next hop address, and a link id.

Since the session controller 200 needs to know every hop in the IP network 100, the session controller 200 creates a routing table for every router in the IP network 100. From this information, the session controller 200 can determine the path which will be chosen by the routers for the communication. Similar to the routers, the session controller 200 calculates new routing tables whenever a new link state advertisement is received. Thus when the network topology changes in the IP network 100, the session controller 200 calculates new routing tables.

As is known, the process of creating routing tables is straightforward and is easily performed utilizing the Dijkstra algorithm. The process of creating routing tables is, however, very CPU intensive. The purpose of creating routing tables is to have information regarding the network topology of the IP network 100. Thus, this purpose may be fulfilled by data structures other than a routing table. For example, a data structure which identifies the path that a communication takes or which paths a flow traverses is contemplated and within the scope of this disclosure.

Figure 3:
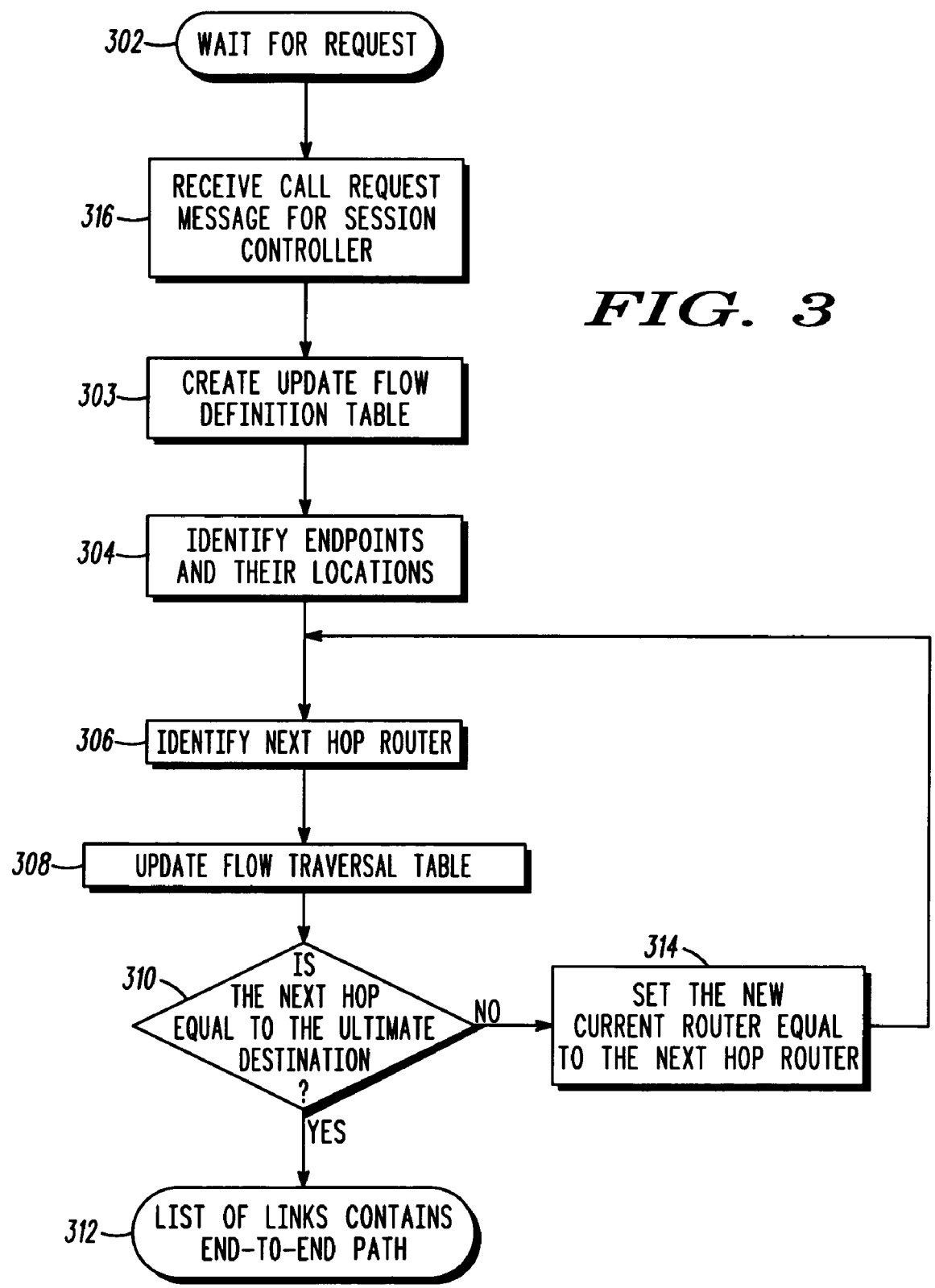
FIG. 3 is a flow diagram illustrating a method for identifying a list of links over which a flow traverses in accordance with one embodiment of the present invention.

In operation, as shown in FIG. 3, the bandwidth manager 208 is normally in an idle state (Block 302) and waits for a request from the policy based admission controller 204. When the session controller 102 receives a call request (also known as a session initialization request) from a client, e.g. client 110, the SIP processor 202 receives the request and forwards the request to the policy based admission controller 204 (Block 316). The policy based admission controller 204 forwards the request to the bandwidth manager 208 (Block 316).

The bandwidth manager 208 updates a flow definition table (Table 706) with information pertaining to the call (Block 303). The bandwidth manager 208 gets information from the admission controller 204 regarding the flow type associated with the call and the bandwidth required for the call. Then, the bandwidth manager 208 assigns a flow id, a flow state and a timestamp for the specific flow relating to the call and updates the flow definition table (Table 706) with the new information (Block 303). The flow definition table (Table 706) specifically identifies a source address, a source port, a destination address, and a destination port which uniquely define the flow for the call.

Next, the bandwidth manager 208 identifies the endpoints of the call and the locations of the clients associated with the call (Block 304). For example, for a call involving client 110 and client 116, the bandwidth manager 208 identifies that client 110 is connected to router 108 and that client 116 is connected to router 114. The bandwidth manager 208 may be given location information from the policy based admission controller which looks up the information in the location manager 206. Alternatively, the bandwidth manager 208 may be given the endpoints of the call (e.g. 110, 116) from the policy based admission controller 204 and the bandwidth manager 208 may look up the information in the location manager 206.

Next, the bandwidth manager 208 identifies the next hop router (Block 306) by looking at the current router's routing table (Table 710). For example, continuing with the example of a call between client 110 and client 116 where client 110 is connected to router 108, the bandwidth manager 208 identifies the next hop router by looking at router 108's routing table to identify that the next hop router is router 112. Then, the bandwidth manager 208 updates the flow traversal table (Table 708) with the information relating to next hop router. Specifically, the flow traversal table (Table 708) is updated to contain information that the flow starts at router 108, contains link 134 and interfaces to router 112 (Block 308). The functions of identifying the next hop router and the updating the flow traversal table (Table 708) are performed until the endpoint is reached.

Next, the bandwidth manager 310 determines whether the next hop is equal to the endpoint (Block 310). If the endpoint is reached, then an end to end flow for the call is determined and a list of links between the clients in the call is established (Block 312). If not, then the bandwidth manager 208 sets the current router to the next hop router (Block 314) and continues with the process of finding the flow between the clients of the call (Block 306). Continuing with the example of a call between client 110 and client 116, the current router is set to router 112. Then, the bandwidth manager 208 updates the flow traversal table (Table 708) with the information relating to the current router 112, the next hop router 114, and the link 136 between the two routers. Since the next hop router 114 is not the ultimate destination, the process of finding the flow between the clients 110, 116 continues. Then, the bandwidth manager 208 sets the current router to the next hop router and the bandwidth manager 208 updates the flow traversal table (Table 708) with the information relating to the current router 114, the next hop router 116, and the link 138 between the two. Since the next hop router is the client 116, the flow between clients 110, 116 is done.

Figure 4:
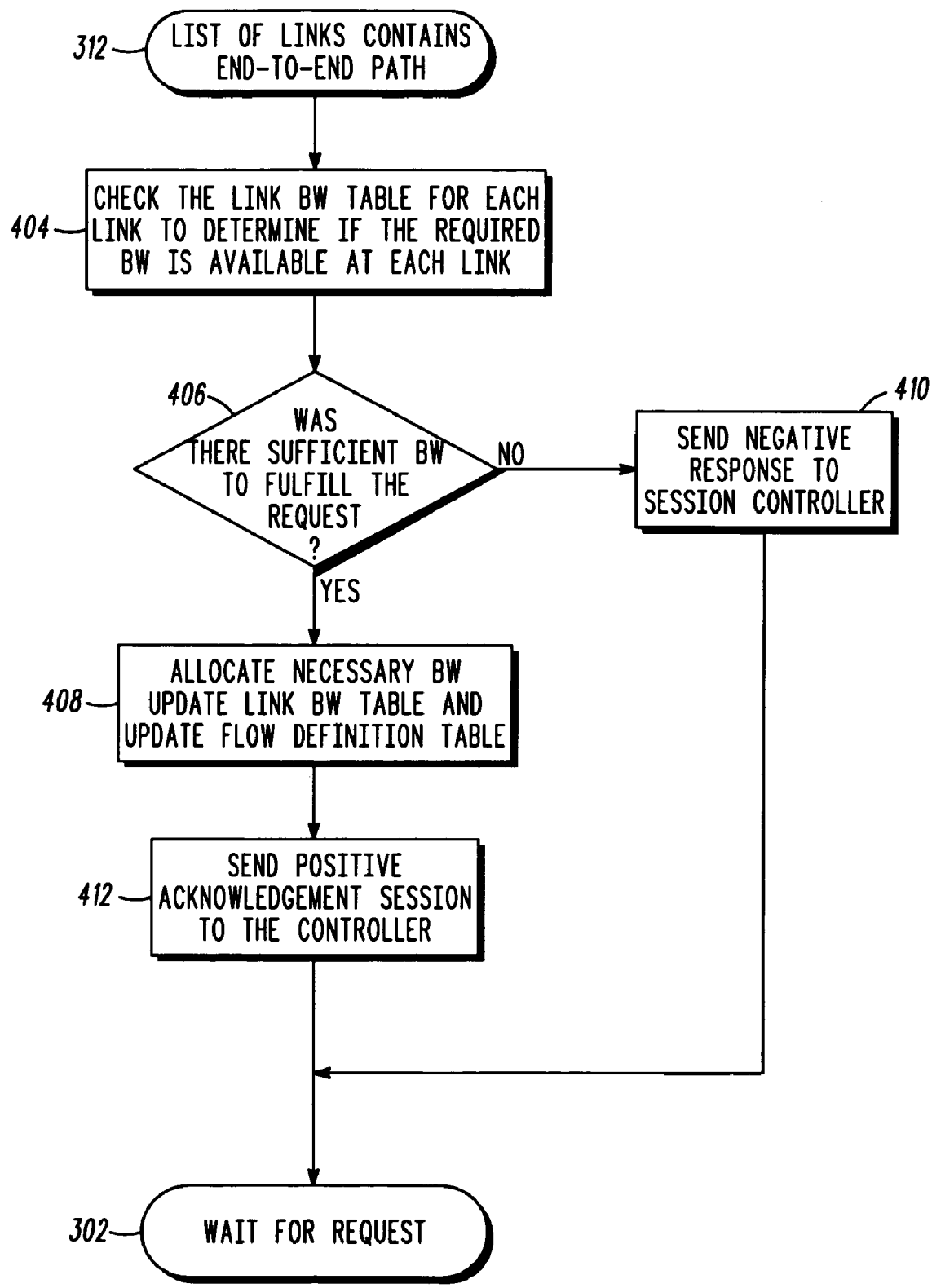
FIG. 4 is a flow diagram illustrating a method for allocating bandwidth in accordance with one embodiment of the present invention.

FIG. 4 is continuation of the process that started in FIG. 3. Having a list of links between the clients in the call (Block 312), the bandwidth manager checks the link bandwidth table (Table 702) to determine whether there is enough bandwidth for each link in the flow (Block 404). For example, for the call between clients 110, 116, the bandwidth manager 208 must determine whether there is enough bandwidth on links 124, 134, 136, and 138 for the call. To determine whether there is enough bandwidth, the bandwidth manager 208 checks the link bandwidth table (Table 702) to see how much bandwidth is allocated to each link. For example, if link 124 is an Ethernet link and has a bandwidth of 10 Mbps, then Table 704 would reflect this information.

The process of determining whether there is enough bandwidth is performed by comparing the allocated bandwidth (Table 702) with the total bandwidth (Table 704) for each link (Block 404). For example, if a particular call requires 100 kbps on link 124, then the bandwidth manager looks to see whether the bandwidth required, e.g. 100 kbps, can be accommodated considering what is already allocated to the link 124 as shown in Table 702 and what the capacity of the link 124 is as shown in Table 704. Stated mathematically, the bandwidth manager determines whether the allocated bandwidth (Table 702) plus the required bandwidth for the call is less than or equal to the capacity of the link (Table 704).

If there is not enough bandwidth for any of the links in the end-to-end path, then the bandwidth manager 208 sends a negative response to the policy based admission controller 204 which forwards the message to the SIP processor 202 to formulate an OSPF message notifying the client that the call could not be set up (Block 410). The bandwidth manager returns to the idle state where the bandwidth manager waits for a request (Block 302). If there is enough bandwidth for all of the links in end to end path, then the bandwidth manager 208 allocates the necessary bandwidth for the call and updates the link bandwidth table (table 702) by incrementing the allocated bandwidth with the required bandwidth for the call (Block 408). In addition, the bandwidth manager 208 updates the flow definition table (table 706) by changing the flow state to reserved (Block 408). Then, the bandwidth manager 208 sends a positive response to the policy based admission controller 204 which forwards the message to the SIP processor 202 to formulate an OSPF message notifying the client that the call has an end-to-end bandwidth reservation (Block 412). At this point, the call is setup and the clients 110, 116 communicate in real-time. The bandwidth manager returns to the idle state where the bandwidth manager waits for a request (Block 302).

Figure 5:
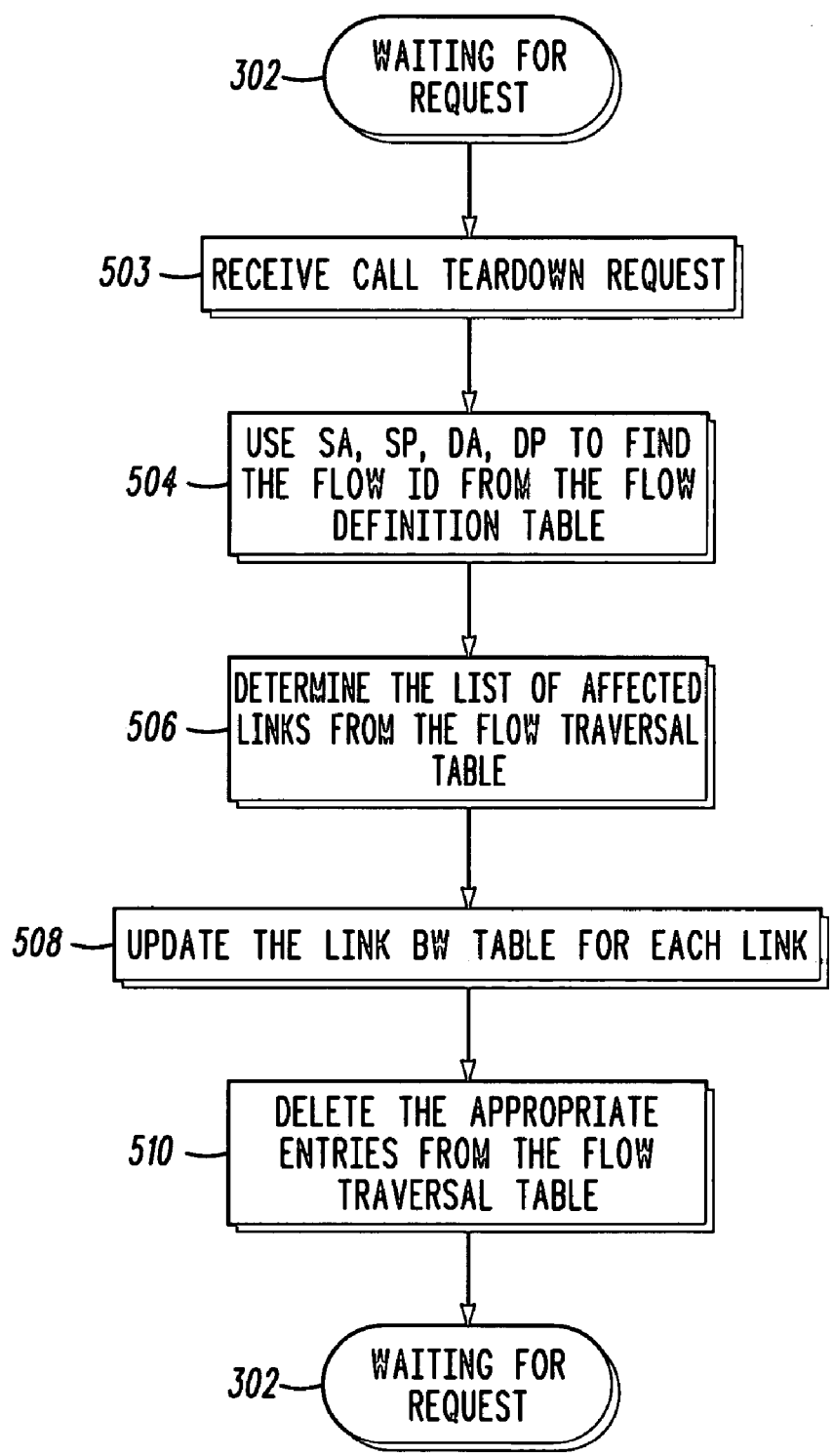
FIG. 5 is a flow diagram illustrating a method for deallocating bandwidth in accordance with one embodiment of the present invention.

When the call is completed, the bandwidth needs to be deallocated. Shown in FIG. 5 is a method for deallocating the bandwidth used in a call. The bandwidth manager 208 waits for a request to teardown the call (Block 502). The bandwidth manager 208 receives a teardown request from the policy based admission controller 204 where the request includes the source address, source port, destination address, destination port of the flow. As mentioned before, these four elements define a flow and are listed in the flow definition table (Table 706) (Block 504). The bandwidth manager 208 looks up the flow id in the flow definition table (Table 706) and uses the flow id to determine the links that were a part of the call by looking at the entries in the flow traversal table (Table 708) (Block 506). Having identified the links involved in the call, the bandwidth manager 208 deallocates the bandwidth allocated for each link in the call from the link bandwidth table (Table 702) (Block 508). Then, the bandwidth manager 208 deletes the entries from the flow traversal table (Table 708) which were associated with the call (Block 510). Upon completion of deallocating the bandwidth associated with the call, the bandwidth manager then returns to the idle state where the bandwidth manager waits for a request (Block 302).

Having discussed the process of tearing down a call, it is important to mention that the process of tearing down is not important to an understanding of an embodiment of the present invention which incorporates a bandwidth manager that is aware of network routing topology and sets up calls understanding the network topology. However, a bandwidth manager which does not perform the function of tear down would be a poor system since the allocated bandwidth would never become reused. Thus, the function of deallocating as described in FIG. 5 is necessary but ancillary to the functionality described in FIGS. 3-4.

When the network topology changes, the bandwidth manager needs to reroute existing flows in the IP network 100. A change in topology may occur if an interface or link becomes disabled. In such situations, the directly affected router sends out a link state advertisement. For example, if an interface or a link, e.g. link 136, goes down on router 114, then router 114 immediately sends out a link state advertisement from each remaining active interface. The routers that receive the link state advertisement from router 114 similarly forward the link state advertisement to the other routers in the IP network 100. Thus, in a very short period of time, the link state advertisement notifying the routers that link 136 on router 114 has gone down is flooded through out the IP network 100.

Figure 6:
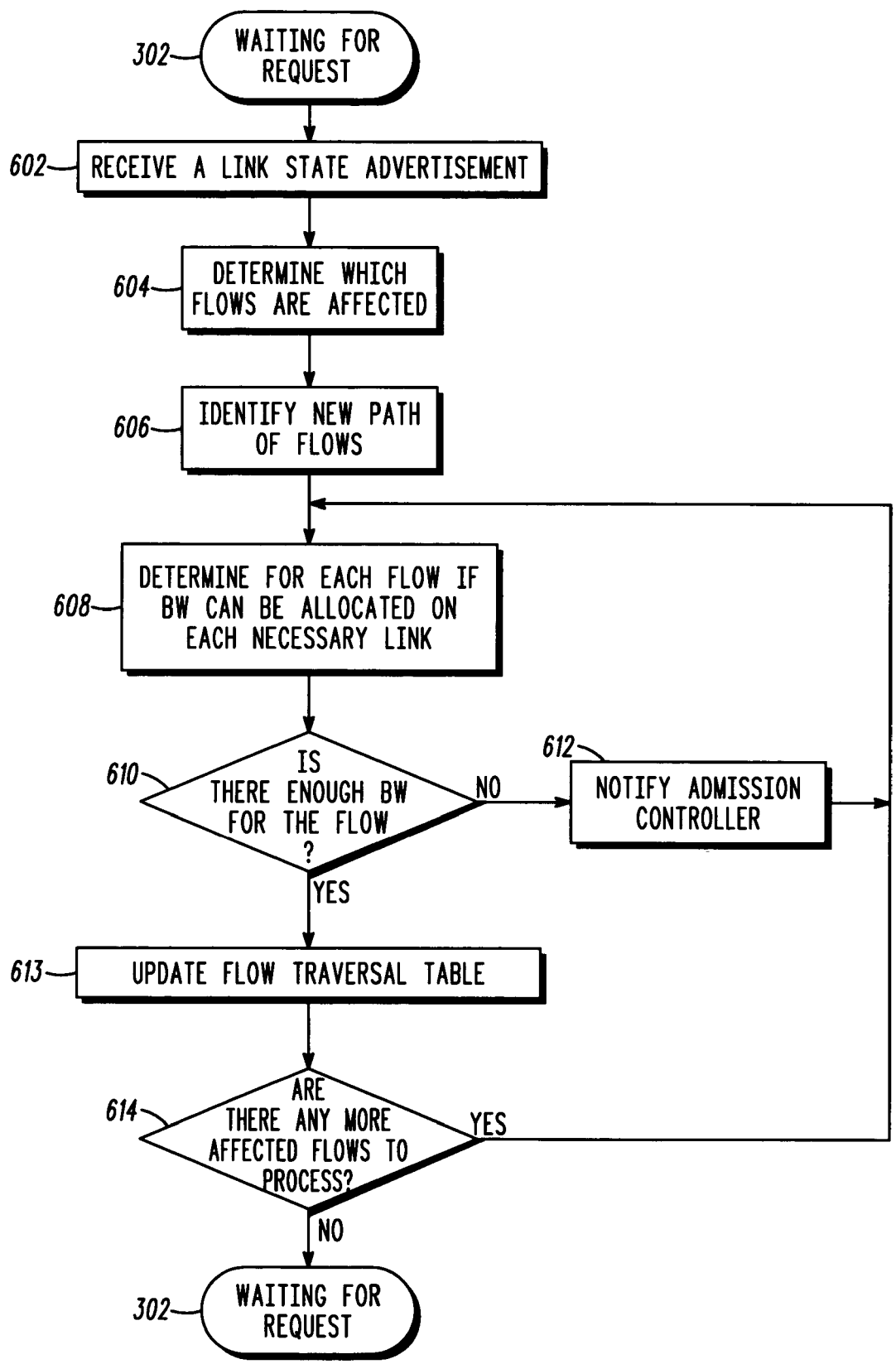
FIG. 6 is a flow diagram illustrating a method for updating flows in response to a network topology change in accordance with one embodiment of the present invention.

Shown in FIG. 6 is a process for updating flows when a network topology change occurs. The bandwidth manager 208 receives a link state advertisement from the affected router in the IP network 100 (Block 602). The bandwidth manager 208 determines which flows are affected by referring to the flow traversal table (Table 708) (Block 604). Then, the bandwidth manager 208 identifies a new path for the affected flows by utilizing the process outlined in FIG. 3 (Block 606). Thus, a new list of links based upon the new routing topology is done for each affected flow (Block 606). Then, the bandwidth manager 208 determines whether bandwidth can be allocated on each link by utilizing a process similar to the process outlined in FIG. 4 (Block 608). That is, the bandwidth manager 208 compares the allocated bandwidth (Table 702) with the total bandwidth (Table 704) for each necessary link in the affected flow (Block 608).

If there is not enough bandwidth for the affected flow (Block 610), then the bandwidth manager 208 notifies the policy based admission controller 204 to send an error message to the SIP processor to facilitate error processing to the clients of the affected flow (Block 612). Continuing, the bandwidth manager handles the next affected flow (Block 608). If there is enough bandwidth for the affected flow (Block 610), then the bandwidth manager 208 updates the flow traversal table (Table 708) and the link bandwidth table (Table 702) with information that the link is being used for the affected flow (Block 613). If there are more affected flows (Block 614), then the process continues for each affected flow in the IP network 100 (Block 608). If there are no more affected flows (Block 614), then the bandwidth manager returns to the idle state where the bandwidth manager waits for a request (Block 302).

In an alternative embodiment, session controllers 102, 164 in the IP network 100 communicate to manage the bandwidth and allow for clients to communicate. For example, this may occur when a client, e.g. client 110, in one IP network wishes to communicate with a client, e.g. client 154, in another IP network. In such a case, the session controller of the first IP network communicates with the session controller of the second IP network to establish a communication between the two clients.

Referring to FIG. 1, if client 110 wishes to communicate with client 154, session controller 102 first determines the endpoints of the call and determines that client 154 is not a client in its domain. Since client 154 is not a client in the session controller's 102 domain, the session controller 102 determines a route from client 110 to a router that serves as an interface point between wired network 122 and a second network, namely router 104. As described before, the session controller 102 builds a set of links for the flow of communications between the end points, namely client 110 and router 104, and determines whether there is enough bandwidth for that flow to be placed. In addition, the session controller 102 forwards the SIP request from client 110 to the session controller 164 in the second network, namely wired network 121. Just like session controller 102, session controller 164 determines the end points of the communications and determines that client 110 is not a client in its domain. Since client 110 is not a client in the session controller's 164 domain, the session controller 164 determines whether there is enough bandwidth between client 154 and the interface point for the wired network 121, namely router 162. The session controller 164 builds a set of links for the flow of communications between the end points, namely router 162 and client 154, and determines whether there is enough bandwidth for that flow to be placed.

In such an embodiment, the bandwidth management technology described is expanded to encompass communication between clients in different domains. Thus, communication between session controllers takes place to allow for clients in different domains to communicate.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. For example, the subscriber unit and/or the base radio may comprise a storage medium having stored thereon a set of instructions which, when loaded into a hardware device (e.g., a microprocessor), causes the hardware device to perform the following functions of the present invention. The present invention can be implemented in at least one of hardware, firmware and/or software. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

It should be noted that the terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language).

I claim:

1. A method for allocating bandwidth for a call between a first client operating in a first Internet Protocol (IP) network and a second client operating in a second IP network, the method comprising:
   at a first session controller of the first IP network:
      determining a first route including a first set of communication links from the first client to a router that serves as an interface point between the first IP network and the second IP network;
      determining for each communication link of the first set of communication links whether an already reserved bandwidth plus a required bandwidth for the call is less than or equal to the total bandwidth capacity for the communication link,
      when there is enough bandwidth on all communication links of the first set of communication links, then allocating the bandwidth to allow the first client to communicate the call with the router, wherein the allocating of the bandwidth includes incrementing the already reserved bandwidth for each communication link of the set of communication links with the required bandwidth for the call, and
      forwarding a request for the call to a second session controller of the second IP network; and
   at the second session controller of the second IP network:
      determining a second route including a second set of communication links from the router to the second client;
      determining for each communication link of the second set of communication links whether an already reserved bandwidth plus a required bandwidth for the call is less than or equal to the total bandwidth capacity for the communication link,
      when there is enough bandwidth on all communication links of the second set of communication links, then allocating the bandwidth to allow the router to communicate the call with the second client, wherein the allocating of the bandwidth includes incrementing the already reserved bandwidth for each communication link of the second set of communication links with the required bandwidth for the call, and
      sending a positive bandwidth reservation response to the request for the call to the first client via the first session controller.

2. The method of claim 1, wherein the determining the first route step comprises:
   at the first session controller:
      creating data structures for storing network topology information wherein the network topology information comprises identification of at least one link in the first IP network;
      identifying the first route including the first set of communication links by utilizing the stored network topology information to build an end to end path; and
   wherein the determining the second route step comprises:
      at the second session controller:
         creating data structures for storing network topology information wherein the network topology information comprises identification of at least one link in the second IP network;
         identifying the second route including the second set of communication links by utilizing the stored network topology information to build an end to end path.

3. The method of claim 2 wherein the steps of creating data structures by the first and second controllers each comprises running a Dijkstra algorithm to create routing tables.

4. The method of claim 2 wherein each of the data structures is chosen from the group comprising routing tables and lists.

5. The method of claim 2 wherein the first session controller comprises a first bandwidth manager, and wherein the second session controller comprises a second bandwidth manager.

6. The method of claim 2 wherein the steps of creating data structures each further comprises receiving link state advertisements comprising network topology information.

7. The method of claim 1 wherein each of the steps of creating data structures is triggered by a change in network topology.

8. The method of claim 1 further comprising:
   receiving a request to teardown the call; and
   decrementing the already reserved bandwidth for each communication link of the first set of communication links and the second set of communication links with the required bandwidth for the call.

9. The method of claim 1, further comprising:
   communicating a request to communicate the call from the first client to the first session controller, wherein the request adheres to an open shortest path first (OSPF) protocol.

10. The method of claim 1, wherein the allocating of the bandwidth by each of the first session controller and second session controller further includes incrementing a variable which tracks the reserved bandwidth on each communication link of the first set of communication links and second set of communication links respectively.

11. The method of claim 1 further comprising:
    sending a message to the first client notifying the first client that the communication could not be set up when there is not enough bandwidth on either the first set of communication links or the second set of communication links.

12. The method of claim 1, further comprising:
    deallocating the allocated bandwidth by decrementing the reserved bandwidth for each communication link of the first set of communication links and the second set of communication links when the call between the first client and the second client is completed.

13. A method of operation of a first bandwidth manager operating in a first Internet Protocol (IP) network and a second bandwidth manager operating in a second IP network for managing bandwidth within the first and second IP networks, the method comprising:
    recognizing that a network topology change has occurred;
    determining one or more communication flows affected by the network topology change;
    for each of the affected communication flows:
       at the first bandwidth manager:
          identifying a first new route comprising a first set of communication links to a router from a first set of clients that serves as an interface point between the first IP network and the second IP network;

determining for each communication link of the first set of communication links whether an already reserved bandwidth plus a required bandwidth for the communication flow is less than or equal to the total bandwidth capacity for the communication link, when there is enough bandwidth on all communication links of the first set of communication links, then allocating the bandwidth to allow the communication flow to the router, wherein the allocating of the bandwidth includes incrementing the already reserved bandwidth for each communication link of the set of communication links with the required bandwidth for the communication flow, and when there is not enough bandwidth on at least one of the communication links of the first set of communication links, processing an error message for the communication flow; and at the second bandwidth manager:

identifying a second new route comprising a second set of communication links from the router to a second set of clients;

determining for each communication link of the second set of communication links whether an already reserved bandwidth plus a required bandwidth for the communication flow is less than or equal to the total bandwidth capacity for the communication link, when there is enough bandwidth on all communication links of the second set of communication links, then allocating the bandwidth to allow the communication flow from the router, wherein the allocating of the bandwidth includes incrementing the already reserved bandwidth for each communication link of the set of communication links with the required bandwidth for the communication flow, and when there is not enough bandwidth on at least one of the communication links of the second set of communication links, processing an error message for the communication flow.

* * * * *